United States Patent
Shekhar

(10) Patent No.: US 12,393,896 B1
(45) Date of Patent: Aug. 19, 2025

(54) SYSTEMS AND METHODS FOR SOLVING MULTI-OBJECTIVE HIERARCHICAL LINEAR PROGRAMMING PROBLEMS IN PARALLEL

(71) Applicant: Blue Yonder Group, Inc., Scottsdale, AZ (US)

(72) Inventor: Tushar Shekhar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 45 days.

(21) Appl. No.: 17/958,155

(22) Filed: Sep. 30, 2022

Related U.S. Application Data

(60) Provisional application No. 63/285,594, filed on Dec. 3, 2021.

(51) Int. Cl.
*G06Q 10/0631* (2023.01)
*G06F 17/12* (2006.01)

(52) U.S. Cl.
CPC ....... *G06Q 10/06315* (2013.01); *G06F 17/12* (2013.01)

(58) Field of Classification Search
CPC ........................... G06Q 10/06315; G06F 17/12
USPC ....................................................... 705/7.25
See application file for complete search history.

(56) References Cited

U.S. PATENT DOCUMENTS

| | | | | |
|---|---|---|---|---|
| 8,429,035 B1 * | 4/2013 | Kamath | ................. | G06Q 10/06 705/28 |
| 11,853,940 B1 * | 12/2023 | Shekhar | ........... | G06Q 10/06315 |
| 11,875,289 B1 * | 1/2024 | Shinde | ............. | G06Q 10/06315 |

* cited by examiner

*Primary Examiner* — Abdallah A El-Hage Hassan
(74) *Attorney, Agent, or Firm* — Spencer Fane LLP; Steven J. Laureanti

(57) ABSTRACT

A system and method are disclosed for solving a multi-objective linear programming supply chain problem. Embodiments include defining a hierarchy of objectives of a supply chain problem, executing a first thread as a mainline solve of a first objective and executing secondary threads as auxiliary solves of additional objectives and determining if a next objective has been solved by the auxiliary solves in response to the first objective being solved. Embodiments further include using the auxiliary solve of a next objective as a starting solution for a mainline solve of the next objective, using a solution from a previous solved mainline objective as a starting solution for a mainline solve of the next objective in response to the next objective of the hierarchy not being solved by the auxiliary solves, and repeating the determining and using steps to solve each objective in the hierarchy.

20 Claims, 10 Drawing Sheets

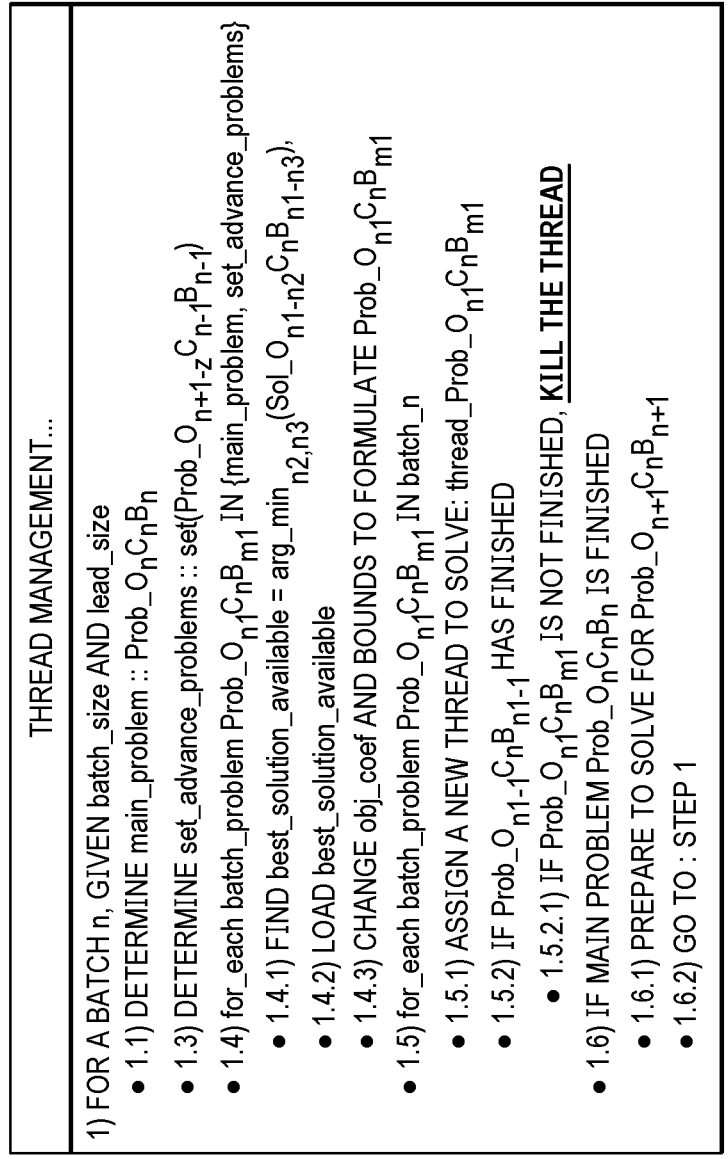

FIG. 7

THREAD MANAGEMENT...

1) FOR A BATCH n, GIVEN batch_size AND lead_size
- 1.1) DETERMINE main_problem :: $Prob\_O_n C_n B_n$
- 1.3) DETERMINE set_advance_problems :: $set(Prob\_O_{n+1-z} C_{n-1} B_{n-1})$
- 1.4) for_each problem $Prob\_O_{n1} C_n B_{m1}$ IN {main_problem, set_advance_problems}
  - 1.4.1) FIND best_solution_available = $\arg\min_{n2,n3}(Sol\_O_{n1-n2} C_n B_{n1-n3})$,
  - 1.4.2) LOAD best_solution_available
  - 1.4.3) CHANGE obj_coef AND BOUNDS TO FORMULATE $Prob\_O_{n1} C_n B_{m1}$
- 1.5) for_each batch_problem $Prob\_O_{n1} C_n B_{m1}$ IN batch_n
  - 1.5.1) ASSIGN A NEW THREAD TO SOLVE: $thread\_Prob\_O_{n1} C_n B_{m1}$
  - 1.5.2) IF $Prob\_O_{n1-1} C_n B_{n1-1}$ HAS FINISHED
    - 1.5.2.1) IF $Prob\_O_{n1} C_n B_{m1}$ IS NOT FINISHED, <u>KILL THE THREAD</u>
- 1.6) IF MAIN PROBLEM $Prob\_O_n C_n B_n$ IS FINISHED
  - 1.6.1) PREPARE TO SOLVE FOR $Prob\_O_{n+1} C_n B_{n+1}$
  - 1.6.2) GO TO : STEP 1

700

| CUSTOMER | Batch_size | Lead_size | ORIGINAL TIME (SEC) | NEW TIME (SEC) | PERF (X TIMES) |
|---|---|---|---|---|---|
| Cust_1 | 4 | 0 | 2387 | 837 | 2.8X |
| Cust_2 | 4 | 0 | 1504 | 585 | 2.57 |

FIG. 8

SYSTEMS AND METHODS FOR SOLVING MULTI-OBJECTIVE HIERARCHICAL LINEAR PROGRAMMING PROBLEMS IN PARALLEL

CROSS REFERENCE TO RELATED APPLICATIONS

The present disclosure is related to that disclosed in the U.S. Provisional Application No. 63/285,594, filed Dec. 3, 2021, entitled "Systems and Methods for Solving Multi-Objective Hierarchical Linear Programming Problems in Parallel." U.S. Provisional Application No. 63/285,594 is assigned to the assignee of the present application. The present invention hereby claims priority under 35 U.S.C. § 119(e) to U.S. Provisional Application No. 63/285,594.

TECHNICAL FIELD

The present disclosure relates generally to supply chain planning and specifically to solving supply chain planning problems modeled as linear programming problems.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. The supply chain planner may update and re-solve the supply chain planning problem from time-to-time when changes occur in the supply chain. However, when solving a multi-objective hierarchical LPP, the objectives need to be solved in sequence, because of a dependence from one objective to the next. Solving multi-objective hierarchical LPPs in sequence can result in significant processing times, which may make it difficult to quickly respond to changes to the underlying supply chain, and can result in significant costs when using cloud-based infrastructure to solve the LPPs, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates an exemplary process for managing threads while solving multi-objective LPP in parallel;

FIG. 8 illustrates an exemplary table showing results from utilizing an embodiment of the present disclosure;

DETAILED DESCRIPTION

Figure 1:
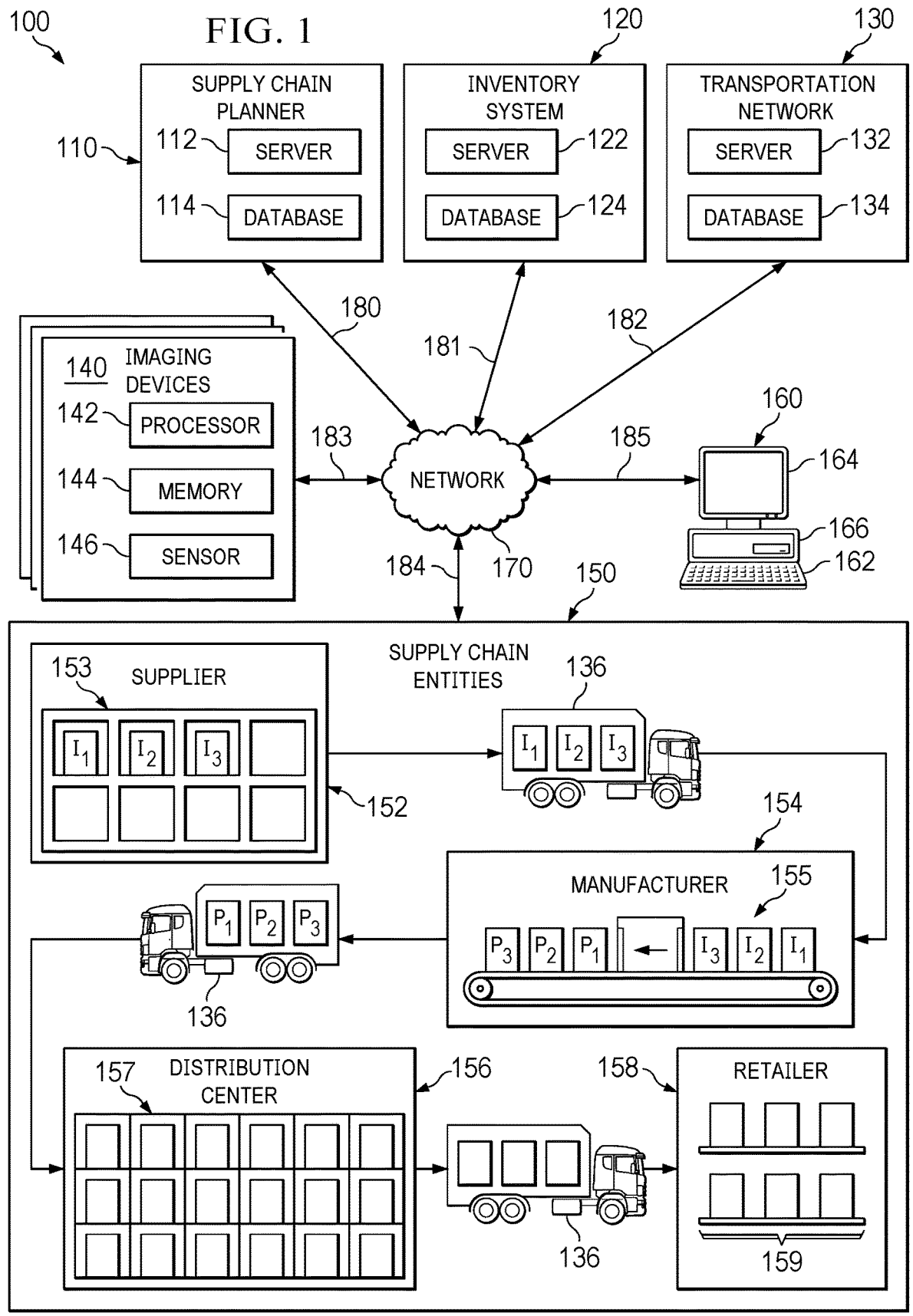
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a system and method to solve a supply chain planning problem modeled as a multi-objective linear programming problem (LPP) with increased speed without impairing the quality of the calculated plan result, by solving objectives subsequent to the current objective in parallel. Embodiments solve a first objective of a multi-objective LPP while, in parallel, solving additional objectives of the multi-objective LPP assuming the same bounds as the first objectives. Embodiments store these solutions to the additional objectives and then solve one or more of the additional objectives using the previous solves for the additional objectives as starting solutions. Embodiments continue this process until all the objectives of the multi-objective LPP have been solved. Embodiments may then utilize this full solution to the multi-objective LPP as part of a supply chain plan. Embodiments provide a novel approach to generate a starting solution and finding the best available starting solution among many available solutions.

Embodiments of the following disclosure significantly reduce the runtime required to re-solve the supply chain planning problem after changes in the supply chain occur by solving objectives of a multi-objective LPP in parallel. Embodiments efficiently solve LPPs without reducing the quality of the final plan, because the starting solutions generated in parallel will always be feasible for the objectives of the multi-objective LPP. Embodiments provide scope to horizontally scale out applications that would otherwise be monolithic. Embodiments provide for supply chain planners to run more fine-grained scenarios, as the reduced run time of problems allows more problems to be solved in a given time period. Embodiments provide for supply chain planners to respond to changes in the underlying supply chain more quickly, as responsive supply chain plans can be generated at a reduced processing time, compared with traditional systems.

FIG. 1 illustrates an exemplary supply chain network 100, in accordance with a first embodiment. Supply chain network 100 comprises supply chain planner 110, inventory system 120, transportation network 130, one or more imaging devices 140, one or more supply chain entities 150, one or more computers 160, network 170, and one or more communication links 180-185. Although a single supply chain planner 110, a single inventory system 120, a single transportation network 130, one or more imaging devices 140, one or more supply chain entities 150, one or more computers 160, a single network 170, and one or more communication links 180-185 are shown and described, embodiments contemplate any number of supply chain planners 110, inventory systems 120, transportation networks 130, imaging devices 140, supply chain entities 150, computers 160, networks 170, and communication links 180-185, according to particular needs.

In one embodiment, supply chain planner 110 comprises server 112 and database 114. Server 112 comprises one or more modules that model, generate, and solve a supply chain planning problem to produce a supply chain plan as a solution to a multi-objective hierarchical LPP. According to embodiments, solver 204 of supply chain planner 110 may solve objectives of the multi-objective hierarchical LPP in parallel to generate starting solutions 232 for objectives beyond first objective 302. As described in more detail herein, solver 204 may solve one or more subsequent objectives using a list of variables to be fixed at their upper and lower bounds, generated during the solve of first objective 302.

After solving for each of the multiple objectives (representing one or more business objectives), the final mathematical solution of the multi-objective hierarchical LPP, when converted to a supply chain, may represent an optimized supply chain plan. Initially, a supply chain planning problem may be converted into a multi-objective LPP wherein the mathematical constraints, objectives, and bounds on variables of the supply chain planning problem is mapped to mathematical expressions in the multi-objective LPP. After solving, the mapping of this conversion may be used to translate the solution of the multi-objective LPP to a supply chain plan.

Inventory system 120 comprises server 122 and database 124. Server 122 of inventory system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items from one or more stocking locations of one or more supply chain entities 150 based, at least in part, on a supply chain plan or a re-allocation of materials or capacity determined by supply chain planner 110. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and the like. One or more transportation vehicles 136 comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

One or more imaging devices 140 comprise one or more processors 142, memory 144, one or more sensors 146, and may include any suitable input device, output device, fixed or removable computer-readable storage media, or the like. According to one embodiment, one or more imaging devices 140 comprise one or more electronic devices that may receive imaging information from one or more sensors 146 or from one or more databases 114 in supply chain network 100. One or more imaging devices 140 may identify one or more items near one or more sensors 146 and generate a mapping of the identified one or more items in supply chain network 100. As explained in more detail below, transportation network 130 and/or one or more supply chain entities 150 use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by solver 204. Plans may comprise one or more of a master supply chain plan, production plan, allocation plan, campaign plan, distribution plan, and the like.

One or more imaging devices 140 may comprise a mobile handheld device such as, for example, a smartphone, a tablet computer, a wireless device, or the like. In addition, or as an alternative, one or more imaging devices 140 comprise one or more networked electronic devices configured to transmit item identity information to one or more databases 114 as an item passes by or is scanned by one or more sensors 146. This may include, for example, a stationary scanner located at transportation network 130 or one or more supply chain entities 150 and which identifies items as the items pass near the scanner, including, for example, in one or more transportation vehicles 136. One or more sensors 146 of one or more imaging devices 140 may comprise an imaging sensor, such as, for example, a camera, scanner, electronic eye, photodiode, charged coupled device (CCD), barcode scanner, or any other device that detects visual information (such as, for example, color, shape, size, fill level, or the like). One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases 114 local to, or remote from, supply chain network 100.

In addition, or as an alternative, one or more sensors 146 may comprise a receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or other like encodings of identifying information. One or more imaging devices 140 may generate a mapping of one or more items in supply chain network 100 by scanning an identifier or object associated with an item and identifying the item based, at least in part, on the scan.

Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with supply chain planner 110, inventory system 120, transportation network 130, one or more imaging devices 140, one or more supply chain entities 150, one or more computers 160, and/or network 170 using one or more communication links 180-185.

As illustrated in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information.

One or more computers 160 may include fixed or removable computer-readable storage media, such as, for example, a non-transitory computer-readable medium, magnetic computer disk, flash drive, CD-ROM, in-memory device or other suitable medium to receive output from, and provide input to, supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may comprise articles of manufacture such as, for example, tangible computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, network 170 of one or more separate or collective computers 160, or may operate on one or more shared computers 160. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including production of items), and/or one or more related tasks within supply chain network 100.

One or more supply chain entities 150 may represent one or more suppliers 152, manufacturers 154, distribution centers 156, and retailers 158 in one or more supply chain networks 100, including one or more enterprises. One or more suppliers 152 may be any suitable entity that offers to sell or otherwise provides one or more items or components to one or more manufacturers 154. One or more suppliers 152 may, for example, receive an item from a first supply chain entity in supply chain network 100 and provide the item to another supply chain entity. Items may comprise, for example, components, materials, products, parts, supplies, or other items, that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers 154 based, at least in part, on a supply chain plan, a material or capacity reallocation, current and projected inventory levels, and/or one or more additional factors described herein.

One or more manufacturers 154 may be any suitable entity that manufactures at least one item. One or more manufacturers 154 may use one or more items during the manufacturing process to produce any manufactured, fabricated, assembled, or otherwise processed item, material, component, good, or product. In one embodiment, a product represents an item ready to be supplied to, for example, another one or more supply chain entities 150, such as one or more suppliers 152, an item that needs further processing, or any other item. One or more manufacturers 154 may, for example, produce and sell a product to one or more suppliers 152, another one or more manufacturers 154, distribution centers 156, retailers 158, a customer, or any other suitable entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity in supply chain network 100 and store and transport the product for a second supply chain entity. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, manufacturers 154, distribution centers 156, and retailers 158 are shown and described as separate and distinct entities, the same entity may simultaneously act as any other one or more suppliers 152, manufacturers 154, distribution centers 156, and retailers 158. For example, one or more manufacturers 154 acting as a manufacturer could produce a product, and the same entity could act as one or more suppliers 152 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 181, which may be any wireline, wireless, or other link suitable to support data communications between inventory system 120 and network 170 during operation of supply chain network 100. Transportation network 130 may be coupled with network 170 using communication link 182, which may be any wireline, wireless, or other link suitable to support data communications between transportation network 130 and network 170 during operation of supply chain network 100. One or more imaging devices 140 are coupled with network 170 using communication link 183, which may be any wireline, wireless, or other link suitable to support data communications between one or more imaging devices 140 and network 170 during operation of distributed supply chain network 100. One or more supply chain entities 150 may be coupled with network 170 using communication link 184, which may be any wireline, wireless, or other link suitable to support data communications between one or more supply chain entities 150 and network 170 during operation of supply chain network 100. One or more computers 160 may be coupled with network 170 using communication link 185, which may be any wireline, wireless, or other link suitable to support data communications between one or more computers 160 and network 170 during operation of supply chain network 100.

Although communication links 180-185 are shown as generally coupling supply chain planner 110, inventory system 120, transportation network 130, one or more imaging devices 140, one or more supply chain entities 150, and one or more computers 160 to network 170, each of supply chain planner 110, inventory system 120, transportation network 130, one or more imaging devices 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and one or more computers 160. For example, data may be maintained locally or externally of supply chain planner 110, inventory system 120, transportation network 130, one or more imaging devices 140, one or more supply chain entities 150, and one or more computers 160 and made available to one or more associated users of supply chain planner 110, inventory system 120, transportation network 130, one or more imaging devices 140, one or more supply chain entities 150, and one or more computers 160 using network 170 or in any other appropriate manner. For example, data may be maintained in a cloud database at one or more locations external to supply chain planner 110, inventory system 120, transportation network 130, one or more imaging devices 140, one or more supply chain entities 150, and one or more computers 160 and made available to one or more associated users of supply chain planner 110, inventory system 120, transportation network 130, one or more imaging devices 140, one or more supply chain entities 150, and one or more computers 160 using network 170, the cloud, or in any other appropriate matter.

Figure 2:
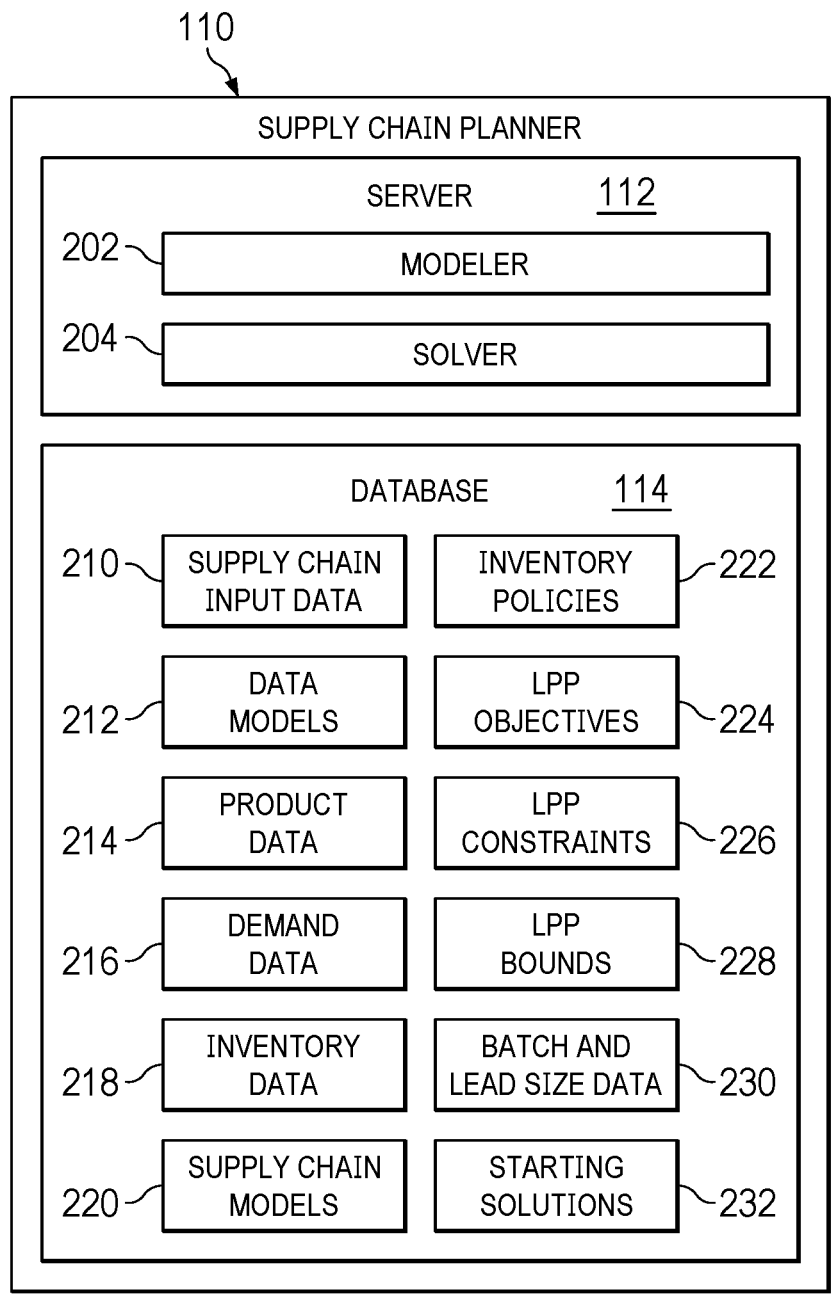
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As described above, supply chain planner 110 comprises server 112 and database 114. Although supply chain planner 110 is shown as comprising a single server 112 and a single database 114, embodiments contemplate any suitable number of servers 112 or databases 114 internal to or externally coupled with supply chain planner 110.

Server 112 of supply chain planner 110 may comprise modeler 202 and solver 204. Although server 112 is shown and described as comprising a single modeler 202 and a single solver 204, embodiments contemplate any suitable number or combination of these located at one or more locations, local to, or remote from supply chain planner 110, such as on multiple servers 112 or computers 160 at any location in supply chain network 100.

According to embodiments, modeler 202 of server 112 identifies resources, operations, buffers, and pathways, and maps supply chain network 100 using data models 212, as described in more detail below. In one embodiment, modeler 202 maps optional resources and material as primary and alternate pathways. In addition, or in the alternative, modeler 202 generates a supply chain planning problem to represent the flow of materials through supply chain network 100.

According to embodiments, solver 204 of supply chain planner 110 solves a supply chain planning problem as an LPP comprising three components: objectives, constraints, and bounds. According to embodiments, objectives of a multi-objective LPP represent business objectives (such as, for example, minimizing total inventory, maximizing profits, etc.); constraints comprise limitations to capacity, materials, lead times, and the like; and bounds comprise maximum and/or minimum values for decision variables (for example, in an embodiment in which capacity may only be used for ten hours per day, ten hours may be the upper bound on the capacity usage).

Database 114 of supply chain planner 110 may comprise one or more databases or other data storage arrangement at one or more locations, local to, or remote from, server 112. Database 114 comprises, for example, supply chain input data 210, data models 212, product data 214, demand data 216, inventory data 218, supply chain models 220, inventory policies 222, LPP objectives 224, LPP constraints 226, LPP bounds 228, batch and lead size data 230 and starting solutions 232. Although database 114 is shown and described as comprising supply chain input data 210, data models 212, product data 214, demand data 216, inventory data 218, supply chain models 220, inventory policies 222, LPP objectives 224, LPP constraints 226, LPP bounds 228, batch and lead size data 230 and starting solutions 232, embodiments contemplate any suitable number or combination of these, located at one or more locations, local to, or remote from, supply chain planner 110 according to particular needs.

As an example only and not by way of limitation, database 114 stores supply chain input data 210, including one or more supply chain planning problems of supply chain network 100 that may be used by supply chain planner 110, modeler 202, and/or solver 204. Supply chain input data 210 may comprise, for example, various decision variables, business constraints, goals, and objectives of one or more supply chain entities 150. According to some embodiments, supply chain input data 210 may comprise hierarchical objectives specified by, for example, business rules, master planning requirements, scheduling constraints, and discrete constraints, including, for example, sequence dependent setup times, lot-sizing, storage, shelf life, and the like.

Data models 212 represent the flow of materials through one or more supply chain entities 150 of supply chain network 100. Modeler 202 of supply chain planner 110 may model the flow of materials through one or more supply chain entities 150 of supply chain network 100 as one or more data models 212 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for data models 212 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Product data 214 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 214 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 216 of database 114 may comprise, for example, any data relating to past sales, past demand, purchase data, promotions, events, or the like of one or more supply chain entities 150. Demand data 216 may cover a time interval such as, for example, by the minute, hour, daily, weekly, monthly, quarterly, yearly, or any suitable time interval, including substantially in real time. According to embodiments, demand data 216 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 218 of database 114 may comprise any data relating to current or projected inventory quantities or states, order rules, or the like. For example, inventory data 218 may comprise the current level of inventory for each item at one or more stocking locations across supply chain network 100. In addition, inventory data 218 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 218 in database 114, which may be used by supply chain planner 110 to place orders, set inventory levels at one or more stocking points, initiate manufacturing of one or more items (or components of one or more items), or the like. In addition, or as an alternative, inventory data 218 may be updated by receiving current item quantities, mappings, or locations from inventory system 120, transportation network 130, one or more imaging devices 140, and/or one or more supply chain entities 150.

Supply chain models 220 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 220 may comprise characteristics that specify the supply chain structure in even more detail, including, for example, specifying the type of collaboration with the customer (e.g. Vendor-Managed Inventory (VMI)), from which stocking locations or suppliers 152 items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 220.

Inventory policies 222 of database 114 may comprise any suitable inventory policy describing the reorder point and target quantity, or other inventory policy parameters that set rules for supply chain planner 110 to manage and reorder inventory. Inventory policies 222 may be based on target service level, demand, cost, fill rate, or the like. According to embodiments, inventory policies 222 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

LPP objectives 224 represent the objectives to be solved of a multi-objective hierarchical LPP. LPP objectives 224 represent the mathematical counterparts of the objectives of supply chain input data 210 discussed above. For example, rather than being an expression of a problem in supply chain terms, e.g., maximizing inventory at a particular location in the supply chain, LPP objectives 224 are the mathematical equivalent, which may be minimizing (or maximizing) a particular variable or linear expression. Generally, each of LPP objectives 224 in a multi-objective hierarchical LPP will be unique, and would be solvable independently if not for LPP constraints 226 and LPP bounds 228.

LPP constraints 226 represent the constraints of a multi-objective hierarchical LPP. LPP constraints 226 represent the mathematical counterparts of the constraints of supply chain input data 210 discussed above. For example, rather than being an expression of a constraint in supply chain terms, e.g., a capacity of a warehouse, LPP constraints 226 are the mathematical equivalent, which may be a requirement that a particular variable not exceed a set value. LPP constraints 226 do not change when solving a multi-objective LPP. That is, although there may be a plurality of LPP objectives 224, there is only one set of LPP constraints 226.

LPP bounds 228 represent the bounds of a multi-objective hierarchical LPP. LPP bounds 228 may be, for example, a requirement that a particular set of variables equal a particular sum, or range of sums. LPP bounds 228 are continuously revised while the multi-objective LPP is solved, becoming more constrictive for each additional objective solved.

Batch and lead size data 230 are used by solver 204 to determine how many additional objectives to pre-solve in parallel (the batch size) as well as how often objectives should be pre-solved again to revise the starting solution for that objective for updated bounds now available. In general, by using a high lead time, the objectives may be revised more frequently as compared with a low lead time. More recently revised solutions may be of more use as starting solutions 232 compared to solutions which have not been revised.

Starting solutions 232 are used by solver 204 to provide a starting point for solving an objective of the multi-objective LPP. In general, a starting solution may be provided to simplify the computational load of solving a particular objective. Many types of data may be provided as a starting solution for solver 204, but better results may be achieved by using starting solutions 232 which are derived from solutions to related objectives. In general, solver 204 generates starting solutions 232 by attempting to solve a second objective using the bounds as currently available for first objective 302. A complete solution to the second objective requires the bounds for the second objective, which are not known at the time of solving first objective 302. However, a starting solution based on the second objective using the bounds of first objective 302 can result in lessened processing time when solving the second objective.

Figure 3:
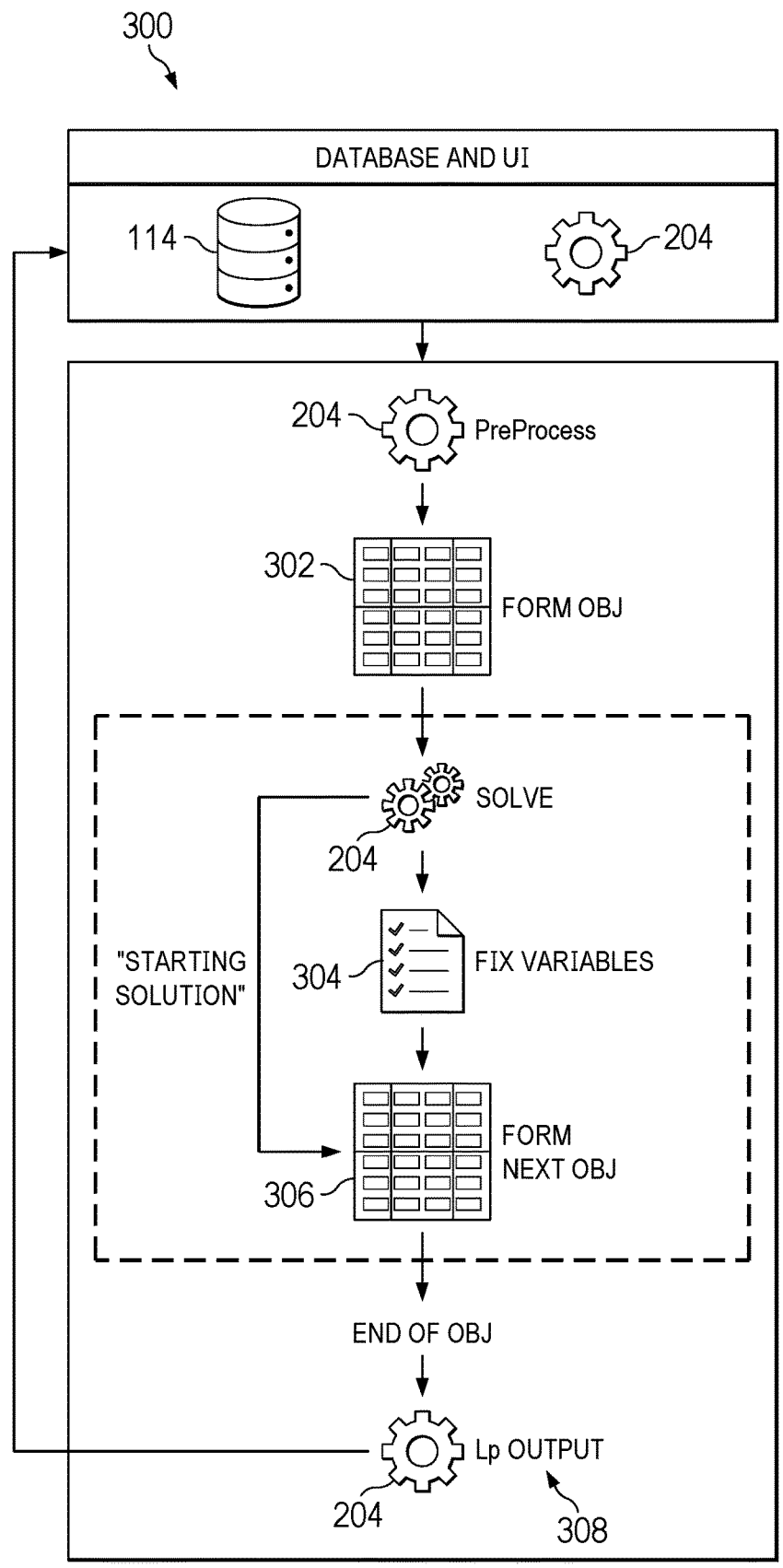
FIG. 3 illustrates an exemplary method for solving a hierarchical multi-objective LPP using starting solutions.

FIG. 3 illustrates exemplary method 300 for solving a hierarchical multi-objective LPP using starting solutions 232. Method 300 illustrated in FIG. 3 starts when solver 204 retrieves from database 114 various data concerning the supply chain modeled as a multi-objective LPP. Solver 204 preprocesses the data to form first objective 302. Then, solver 204 solves first objective 302. Solver 204 then performs variable fixing 304 to preserve the hierarchy of the multi-objective problem, so that solutions to subsequent objectives will still work as solutions for first objective 302. The result of variable fixing is a set of bounds for the multi-objective hierarchical LPP.

Then, solver 204 forms next objective 306 using the bounds. Solver 204 also applies the solution obtained for first objective 302 to next objective 306, to improve the performance of the solve of next objective 306. Then, solver 204 stores LP output 308 from solver 204 in database 114, and repeats the above steps for as many objectives as there are in the multi-objective LPP. One limitation of method 300 is that the objectives must be solved in sequence, as each solution for each objective relies on the solution to the previous objective, as well as the bounds. As discussed in further detail below, embodiments of the present disclosure provide for systems and methods to enable objectives of a multi-objective hierarchical LPP to be solved in parallel.

Figure 4:
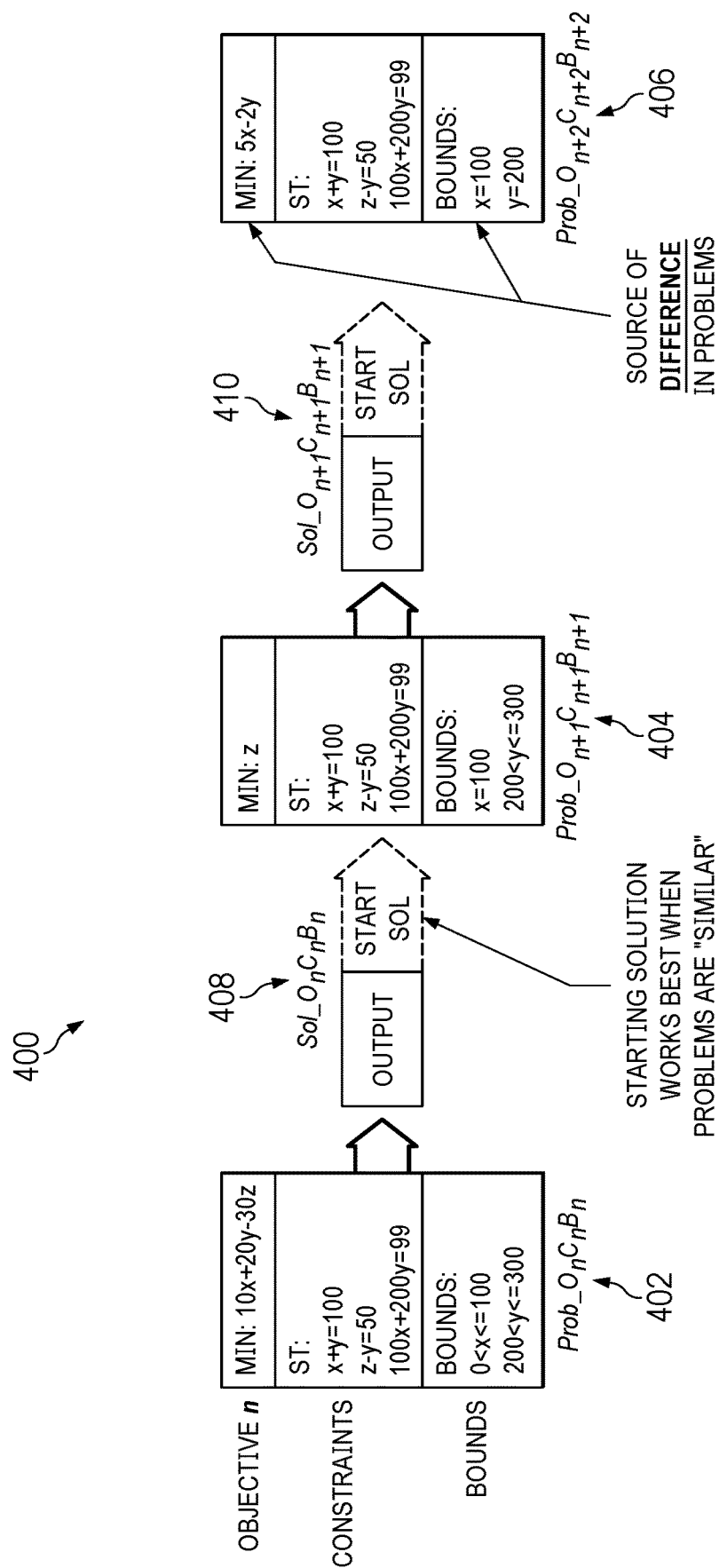
FIG. 4 illustrates an exemplary method for solving a multi-objective hierarchical LPP.

FIG. 4 illustrates exemplary method 400 for solving a multi-objective hierarchical LPP. Method 400 shown in FIG. 4 is simplified for ease of explanation and may not comprise a solvable LPP. Three stages, or problems, of the multi-objective hierarchical LPP are shown, Prob_$O_nC_nB_n$ 402, Prob_$O_{n+1}C_nB_{n+1}$ 404, and Prob_$O_{n+2}C_nB_{n+2}$ 406. In these objectives, "O" stands for objective, "C" for constraints and "B" for bounds. As shown, each stage includes a different objective and different bounds, while each carry the same constraints. The bounds are refined at each stage to ensure that the solution to a subsequent objective will still work for prior objectives. For example, the bounds of objective n+1 limit the possible solutions to $O_{n+1}$ so that such solutions will work as solutions for $O_n$.

In the method of FIG. 4, a solution for Prob_$O_nC_nB_n$ is termed Sol_$O_nC_nB_n$ 408. Solver 204 applies the output from Prob_$O_nC_nB_n$ 402 (Sol_$O_nC_nB_n$ 408) as a starting point for the optimization performed at the second stage for Prob_$O_{n+1}C_nB_{n+1}$ 404. Solver 204 similarly applies the solution to Prob_$O_{n+1}C_nB_{n+1}$ 404 (Sol_$O_{n+1}C_{n+1}B_{n+1}$ 410) as a starting point for Prob_$O_{n+2}C_nB_{n+2}$ 406.

As shown, because the constraints of the problems remain the same, differences in the problems are introduced from the objectives and the bounds. The bounds are revised following every problem solution, so they cannot be used in advance. However, all objectives may be known to solver 204 at the time first objective 302 is solved. Thus, solver 204 can attempt to solve objectives following first objective 302 in parallel, as long as certain assumptions are made with respect to the bounds of the problem.

Figure 5:
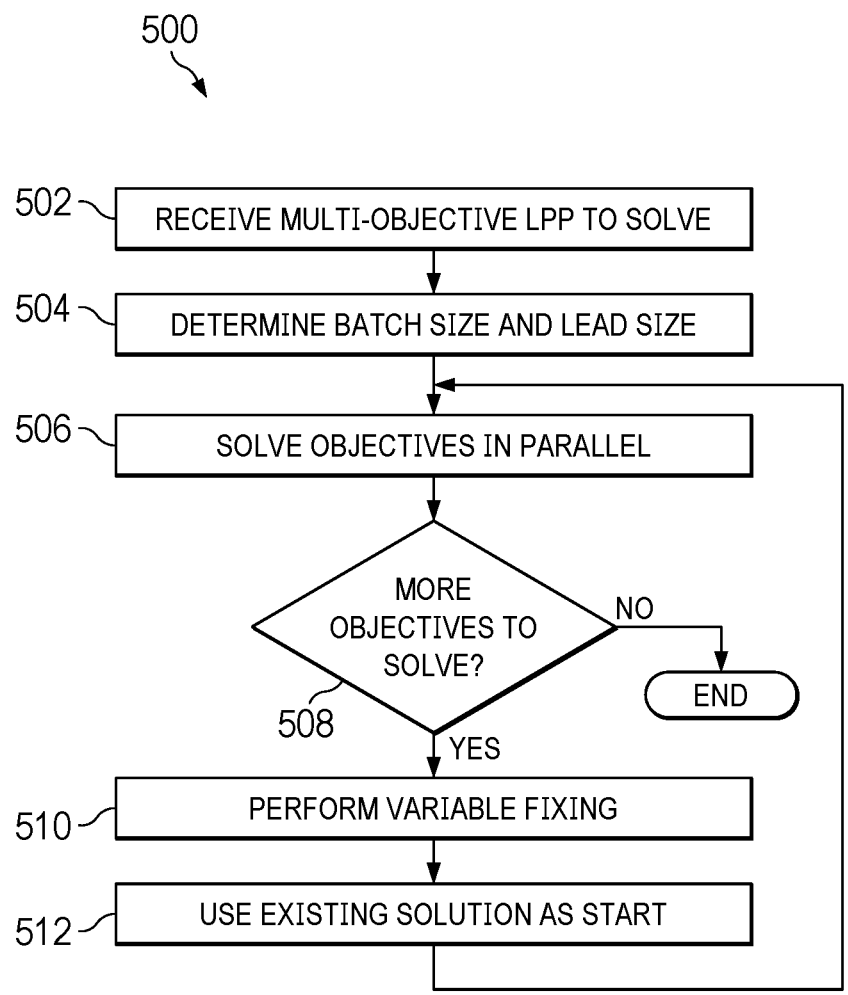
FIG. 5 illustrates an exemplary method for solving multi-objective hierarchical LPP in parallel.

FIG. 5 illustrates exemplary method 500 for solving multi-objective hierarchical LPP in parallel. Method 500 may be performed by a solver, such as solver 204 of FIG. 2. Method 500 begins with activity 502, where the multi-objective LPP to solve is received. The multi-objective LPP may be received from database 114 storing supply chain information and supply chain models 220, or the multi-objective LPP may be received by solver 204 formulating a supply chain model into a multi-objective LPP.

At activity 504, solver 204 determines a batch size and a lead size for the multi-objective LPP. The batch size and lead size may be specified by a user of the planner or may be set dynamically according to system resources. The batch size specifies a number of objectives to solve in parallel. The batch size may be as large as the processing limits allowable by the hardware supporting the planner. The lead size specifies how frequently starting solutions 232 to objectives should be revised based on updated bounds. If a lead size of 0 is determined, then solver 204 will not revise starting solutions 232, which may save on processing resources.

At activity 506, solver 204 solves objectives of the multi-objective LPP in parallel. For example, on a first run, solver 204 will solve first objective 302 of the multi-objective LPP as well as an additional number of objectives of the multi-objective LPP equal to the batch size determined at activity 504. Solver 204 at the time of this solve does not have access to the bounds associated with the later objectives, because the bounds associated with later objectives are the result of variable fixing performed based on the solution to first objective 302. Solver 204 instead uses the bounds associated with the current objective to generate starting solutions 232 for subsequent objectives.

Because different objectives of the multi-objective LPP can be vastly different, starting solutions 232 based on a previous objective may not be a good starting solution. Using method 500 of FIG. 5, however, solver 204 can generate starting solutions 232 based on the objective itself, albeit calculated with a different bounds. The starting solution for a particular objective cannot be used as a solution for the reason that it may not comply with the bounds of the particular objective. However, a starting solution based on a previous objective's bounds may result in significant reductions in processing times compared to starting solutions 232 based on different objectives entirely.

In general, starting solutions 232 can be defined in the following way. A starting solution to a problem Prob_$O_{n+1}C_nB_{n+1}$, may be Sol_$O_{n+1}C_nB_{n-x}$, where $O_{n+1}$ is objective number n+1, $C_n$ is the constraints, $B_{n+1}$ is the bounds for objective number n+1 and $B_{n-x}$ is the bounds for objective number n−x, where x is the solution lag. The solution lag is preferably kept low so as to keep starting solutions 232 as close as possible to the actual solutions. However, starting solutions 232 need to be completed before the problem they are needed for starts solving.

At activity 508, solver 204 determines if there are additional objectives to solve. If there are additional objectives to solve, at activity 510, solver 204 performs variable fixing, which creates the bounds to be used in solving subsequent objectives. Variable fixing requires that subsequent solutions fall into a specified range (or meet a specified value) for certain variables to maintain optimality for objectives solved first.

At activity 512, solver 204 uses the solutions determined at activity 506 as a starting point for next objective 306. Continuing the example above, solver 204 may utilize a solution to the second objective, calculated using the bounds according to first objective 302, as a starting point for optimization the second objective. Solver 204 then returns to activity 506, and solves next objective 306, as well as additional number of additional objectives as specified by the batch size. At this time, solver 204 may revise solutions to already-solved objectives, if the lead size specifies that some objectives should be re-calculated based on the bounds according to the second objective. Method 500 ends when solver 204 has solved all the objectives of the multi-objective LPP.

Figure 6:
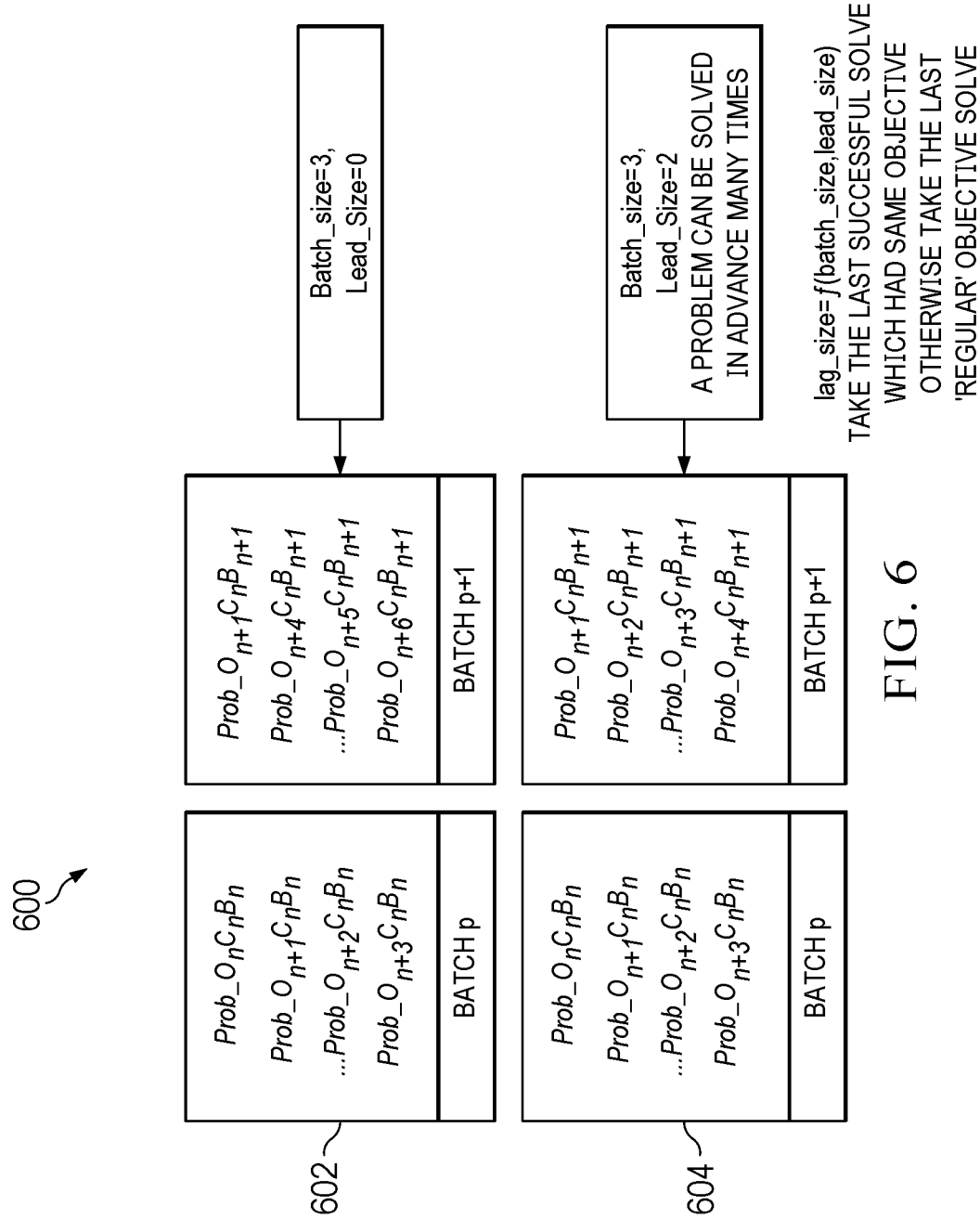
FIG. 6 illustrates an exemplary method for determining which objectives to solve or revise based on batch size and lead size.

FIG. 6 illustrates an exemplary method 600 for determining which objectives to solve or revise based on batch size and lead size. FIG. 6 includes two examples, batches p and p+1 with a batch size of 3 and a lead size of 0, as well as batches p and p+1 with a batch size of 3 and a lead size of 0. One possible formula for applying batch size and lead size is this: on a first batch, solver 204 solves problems Prob_$O_nC_nB_n$ through Prob_$O_{n+m}C_nB_n$, where m is the batch size. Then, on subsequent batches, solver 204 solves problems Prob_$O_{n+1}C_nB_{n+1}$, Prob_$O_{n+m+1-z}C_nB_{n+1}$, and through to Prob_$O_{n+2m-z}C_nB_{n+1}$, where n is the lead size.

In first example 602, the batch size is 3 and the lead size is 0. Because the lead size is 0, no starting solutions 232 will be revised in first example 602. As the batch size is three, in the first patch (batch p) three problems are solved in addition to the problem. These problems are Prob_$O_nC_nB_n$, Prob_$O_{n+1}C_nB_n$, Prob_$O_{n+2}C_nB_n$, and Prob_$O_{n+3}C_nB_n$. Note that, while the objectives change in these problems, the constraints and bounds do not. This is because solver 204 uses the bounds associated with first objective 302 to calculate starting solutions 232 to additional objectives. At the second batch (batch p+1) of first example 602, the second objective, Prob_$O_{n+1}C_nB_{n+1}$, is solved using the solution to Prob_$O_{n+1}C_nB_n$, as a starting point. At the same time, three additional problems are once again solved, Prob_$O_{n+4}C_nB_{n+1}$, Prob_$O_{n+5}C_nB_{n+1}$, and Prob_$O_{n+6}C_nB_{n+1}$. These three problems are solved according to the most recent bounds, the bounds from the second problem, $B_{n+1}$.

In second example 604, the batch size remains 3 and lead size is 2. The first batch (batch p) is the same as shown in first example 602, because lead size does not affect the first batch of solver 204. However, at the second batch (batch p+1), the lead size of 2 causes all but one of the objectives solved in the first batch to be revised according to the bounds of the second problem. As a result, the problems solved at the second batch are Prob_$O_{n+2}C_nB_{n+1}$, Prob_$O_{n+3}C_nB_{n+1}$, and Prob_$O_{n+4}C_nB_{n+1}$, two of which are duplicative of the first batch. If, for example, the lead size was instead 1, the problems solved would be Prob_$O_{n+3}C_nB_{n+1}$, Prob_$O_{n+4}C_nB_{n+1}$, and Prob_$O_{n+5}C_nB_{n+1}$, only one of which is duplicative of the first batch. In general, a lead size that is one less than the batch size will result in all existing starting solutions 232 being revised, with the exception of the starting solution used in the next batch.

FIG. 7 illustrates exemplary process 700 for managing threads while solving multi-objective LPP in parallel. Solver 204 may make use of threading to solve objectives in parallel.

When a multi-objective LPP is being solved in parallel, an active thread of solver 204 should not be killed, unless the objective being solved by that thread has now become the main objective being solved. For example, if a thread is solving objective n, that thread should run until such time as the problem Prob_$O_{n-1}C_nB_{n-1}$, has been solved, meaning objective n is now the main objective. When Prob_$O_{n-1}C_nB_{n-1}$, has been solved, if the thread solving objective n has not completed that thread should be killed.

When solver 204 is using starting solutions 232, solver 204 looks back at all the problems which have been solved as part of previous batches, and uses a solution which has minimum lag in the bounds. In some cases, there may be multiple solutions to a given objective that have finished, or is concurrently running. For example, given a suitable lead size, it may be that two problems containing objective $O_{n+2}$ may be running concurrently, as one may have started in a first batch and a second may have started in a second batch. When a problem containing objective $O_{n+2}$ becomes the main problem, solver 204 will have to determine which, if any, of the previous $O_{n+2}$ problems has finished solving, and will take the solution with a bounds closest to the bounds specified in the main problem (e.g., if the main problem has bounds $B_{n+2}$ solver 204 will prefer solutions with $B_{n+1}$ to solutions with $B_n$). At such time solver 204 will also kill any live threads solving problems containing objective $O_{n+2}$.

FIG. 8 illustrates exemplary table 800 showing results from utilizing an embodiment of the present disclosure. The data of FIG. 8 is recorded for 2 customers, using a batch size of 4 and a lead size of 0 for both. For first customer 802, original (non-parallel) solution 806 took 2387 seconds, while new solution 808 (in parallel) took only 837 seconds, a 2.8 times increase in performance 810. Similarly, for second customer 804, original solution 806 took 1504 seconds while new solution 808 took 585 seconds, a 2.57 times increase in performance 810.

Because supply chain multi-objective hierarchical LPP can be extremely complex, a single production run of solver 204 may take 8 hours (or longer). Such time periods make it incredibly difficult to respond to changes to the supply chain, such as an increased demand for an item. Use of the systems and methods of the present disclosure in such a case could result in a vast decrease in solution time, from 8 hours to 3.2 hours if a performance increase of 2.5 times is assumed. Such a time savings leads to significantly increased agility within the supply chain in terms of ability to adjust to changing conditions. Such a performance increase also naturally save on processing resources which can be devoted to other tasks, or may result in a cost savings if cloud-based processing infrastructure is used.

Figure 9:
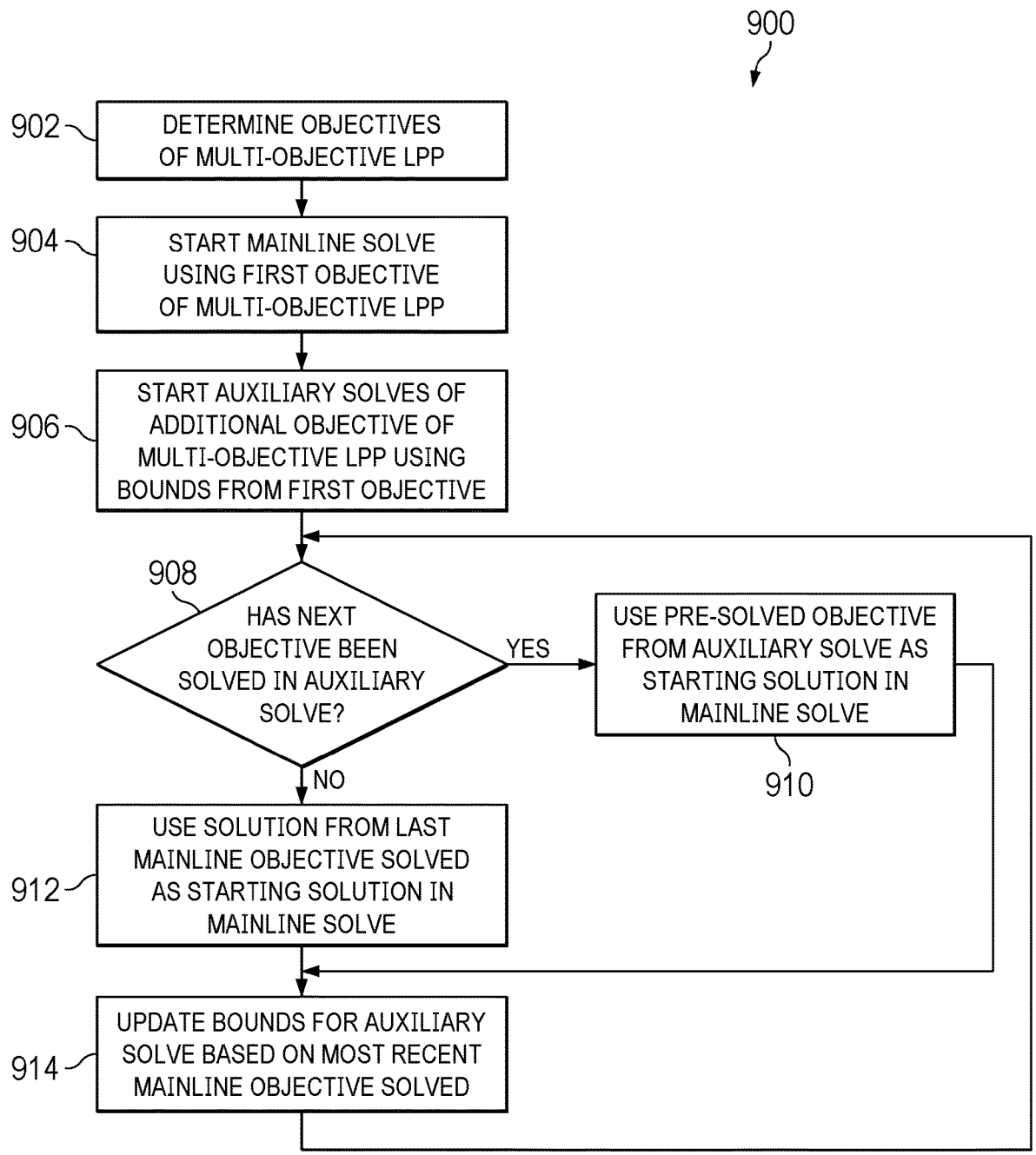
FIG. 9 illustrates an exemplary method for solving multi-objective LPP using mainline and auxiliary solves.

FIG. 9 illustrates exemplary method 900 for solving multi-objective LPP using mainline and auxiliary solves. Method 900 may be performed by a solver, such as solver 204 of FIG. 2. Method 900 comprises one or more activities, which although described in a particular order may be implemented in one or more combinations, according to particular needs.

Method 900 begins with activity 902, where solver 204 determines the objectives of a multi-objective hierarchical LPP. Prior to activity 902, solver 204 may have received the multi-objective LPP, such as, for example, from database 114 storing supply chain information and supply chain models 220, or the multi-objective LPP may be received by solver 204 formulating a supply chain model into a multi-objective LPP. Solver 204 determines the order of the objectives of multi-objective LPP, such that objectives subsequent to a first objective of the multi-objective LPP may be solved in parallel with the first objective.

At activity 904, solver 204 starts a mainline solve using the first objective of the multi-objective LPP. In embodiments, because the multi-objective LPP is hierarchical, there is a first objective to be solved prior to the other objectives. The objectives of the multi-objective LPP may, in certain circumstances have little or no relation to one another. For example, as illustrated by FIG. 4, some objectives may involve the optimization of a first variable, while other objectives may involve the optimizations of other variables independent from the first variable.

At activity 906, solver 204 starts one or more auxiliary solves of additional objectives of the multi-objective LPP. Solver 204 uses the bounds established by the mainline solve in the first objective when performing the one or more auxiliary solves. That is, while the mainline solve, using, for example, one thread of a threaded architecture, attempts to solve the first objective, solver 204 may start additional threads to attempt to solve subsequent objectives of the multi-objective LPP. Such solutions may not be usable as replacements for solutions from the mainline solve, as they must conform to bounds set by solutions of the mainline solve. However, solver 204 may utilize these auxiliary solves as a starting solution when the mainline solve reaches an objective for which an auxiliary solve has been completed. At activity 908, solver 204 determines if a next objective in the multi-objective LPP has been solved by the one or more auxiliary solves.

If a next objective has been solved by the one or more auxiliary solves, at activity 910 solver 204 uses the pre-solved objective from the auxiliary solve as a starting solution for that objective in the mainline solve. The use of such a starting solution, as illustrated by FIG. 8, may result in significant decreases in solve time, which results in significant reduction in computing resources required to solve the multi-objective LPP.

If a next objective has not been solved by the one or more auxiliary solves, at activity 912 solver 204 uses the solution to the last solved objective from the mainline solve as a starting solution in the mainline solve. That is, if the one or more auxiliary solves, for whatever reason, has failed to complete a solution for a particular objective before that objective is up next in the mainline solve, solver 204 defaults to the last known solution from the mainline solve. In other embodiments, solver 204 may delay the continuation of the mainline solve to allow the one or more auxiliary solves to complete the solution for the objective.

At activity 914, solver 204 updates the bounds for the one or more auxiliary solves based on the most recently solved mainline objective. To keep the bounds used by the one or more auxiliary solves as up to date as possible, solver 204 updates the bounds for the objectives solved by the one or more auxiliary solves. Because the bounds will become more restrictive through additional objective solves, updating the bounds may in some circumstances lead to improved performance by the one or more auxiliary solves, which in turn may lead to more starting solutions that may be available to be used by the mainline solve.

After activity 914, method 900 returns to activity 908, where solver 204 again determines if the mainline solve has completed the solve for a next objective. Method 900 may repeat until all objectives of the multi-objective LPP have been solved by the mainline solve.

Figure 10:
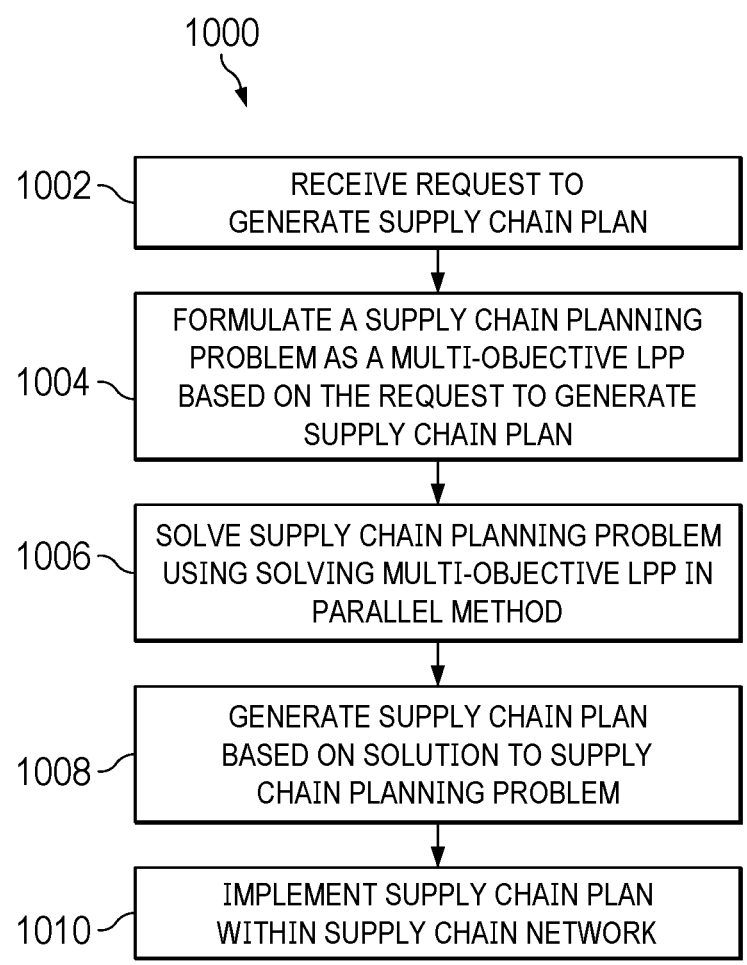
FIG. 10 illustrates an exemplary method for implementing a supply chain plan using a multi-objective hierarchical LPP solved in parallel.

FIG. 10 illustrates exemplary method 1000 for implementing a supply chain plan using a multi-objective hierarchical LPP solved in parallel. Method 1000 may be performed by a supply chain planner, such as supply chain planner 110 of FIG. 1. Method 1000 comprises one or more activities, which although described in a particular order may be implemented in one or more combinations, according to particular needs.

Method 1000 begins with activity 1002, where supply chain planner 110 receives a request to generate a supply chain plan for a supply chain network, such as supply chain network 100 of FIG. 1. In embodiments, the request to generate the supply chain plan may be received by supply chain planner 110 according to a periodic schedule, such as a schedule to update or revise a supply chain plan every week or every month. In other embodiments, the request to generate the supply chain plan may be received by supply chain planner 110 by a user of supply chain planner 110, such as via computer 160 of FIG. 1.

At activity 1004, supply chain planner 110 formulates one or more supply chain planning problems as a multi-objective hierarchical LPP, based on the request to generate the supply chain plan received at activity 1002. For example, the multi-objective hierarchical LPP may include various objectives corresponding to elements of supply chain network 100, such as keeping safety stock at a particular location above a certain level, or keeping a shipment time for a particular product below a certain level. Because multi-objective hierarchical LPPs can be very time consuming to solve, existing methods of solving multi-objective hierarchical LPPs may significantly slow down the process of generating supply chain plans, which impairs the ability of supply chain planners to respond to changes in the underlying supply chain network.

At activity 1006, a solver, such as solver 204, solves the supply chain planning problem formulated at activity 1004 using a method of solving multi-objective LPPs in parallel. For example, solver 204 may utilize method 500 disclosed in FIG. 5 above, or method 900 disclosed in FIG. 9 above. Use of methods 500 or 900 may result in reduced use of computational resources and reduced solving time, which may improve the flexibility and ability of supply chain planner 110 to quickly respond to changes in supply chain network 100.

At activity 1008, supply chain planner 110 generates a supply chain plan for supply chain network 100 based at least in part on the solution to the supply chain planning problem generated at activity 1006. The supply chain plan may specify one or more actions to be taken with supply chain network 100 to meet the requirements of the supply chain plan.

At activity 1010, supply chain planner 110 implements the supply chain plan within supply chain network 100. In embodiments, implementing the supply chain plan may involve the utilization of one or more pieces of automated machinery. For example, if the supply chain plan involves a change to a manufacturing facility, automated distribution systems 153 may be utilized. In other embodiments, automated robotic production machinery 155, automated warehousing systems 157 or shelving systems 159 may be utilized depending on the one or more actions of the supply chain plan.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of solving a supply chain planning problem modeled as a multi-objective hierarchical linear programming problem, comprising:
   a threaded architecture comprising at least a first thread and one or more secondary threads;
   a computer, comprising a processor and memory, and configured to execute multiple threads of the threaded architecture to solve the supply chain planning problem by:
      receiving supply chain input data for the supply chain planning problem;
      modeling the supply chain planning problem as the multi-objective hierarchal linear programming problem based on the supply chain input data;
      defining a hierarchy of one or more objectives specifying an order of solving the one or more objectives of the supply chain planning problem;
      executing the first thread as a mainline solve of a first objective and executing the one or more secondary threads as one or more auxiliary solves of one or more additional objectives;
      determining if a next objective of the hierarchy has been solved by the one or more auxiliary solves in response to the first objective being solved, and in response to the next objective being solved, using the auxiliary solve of the next objective as a starting solution for a mainline solve of the next objective;
      using a solution from a previous solved mainline objective as a starting solution for a mainline solve of the next objective in response to the next objective of the hierarchy not being solved by the one or more auxiliary solves;
      killing any live threads being processed by a solver, wherein the any live threads are solving one or more solutions whose bounds are farther away than a solution associated with a particular thread, wherein the solution associated with the particular thread has bounds that are closest to a bounds specified by the multi-objective hierarchical linear programming problem; and
      repeating the determining and using steps to solve each objective in the hierarchy.

2. The system of claim 1, wherein the computer is further configured to execute multiple threads to solve the supply chain planning problem by:
   delaying a continuation of a mainline solve to allow the one or more auxiliary solves to complete the one or more additional objectives.

3. The system of claim 1, wherein the computer is further configured to execute multiple threads to solve the supply chain planning problem by:
   updating bounds for the one or more auxiliary solves based on a most recently solved mainline objective.

4. The system of claim 1, wherein the one more objectives of the hierarchy each correspond to optimization of a variable independent of other objectives in the hierarchy.

5. The system of claim 1, wherein the computer is further configured to execute multiple threads to solve the supply chain planning problem by:
   determining a batch size and a lead size for solving the first objective in parallel with the one or more additional objectives by executing the first and one or more secondary threads in parallel.

6. The system of claim 5, wherein the batch size defines a size of a batch of objectives to solve and the lead size defines how frequent the one or more additional objectives are solved in advance.

7. The system of claim 1, wherein the computer is further configured to execute multiple threads to solve the supply chain planning problem by:
   generating a supply chain plan for a supply chain network based at least in part on the solved objectives in the hierarchy.

8. A computer-implemented method to solve a supply chain planning problem modeled as a multi-objective hierarchical linear programming problem, comprising:
   providing a threaded architecture comprising at least a first thread and one or more secondary threads;
   receiving, by a computer comprising a processor and memory and configured to execute multiple threads of the threaded architecture, supply chain input data for the supply chain planning problem;

modeling, by the computer, the supply chain planning problem as the multi-objective hierarchal linear programming problem based on the supply chain input data;

defining, by the computer, a hierarchy of one or more objectives specifying an order of solving the one or more objectives of the supply chain planning problem;

executing, by the computer, the first thread as a mainline solve of a first objective and executing the one or more secondary threads as one or more auxiliary solves of one or more additional objectives;

determining, by the computer, if a next objective of the hierarchy has been solved by the one or more auxiliary solves in response to the first objective being solved, and in response to the next objective being solved, using the auxiliary solve of the next objective as a starting solution for a mainline solve of the next objective;

using, by the computer, a solution from a previous solved mainline objective as a starting solution for a mainline solve of the next objective in response to the next objective of the hierarchy not being solved by the one or more auxiliary solves;

killing, by the computer, any live threads being processed by a solver, wherein the any live threads are solving one or more solutions whose bounds are farther away than a solution associated with a particular thread, wherein the solution associated with the particular thread has bounds that are closest to a bounds specified by the multi-objective hierarchical linear programming problem; and repeating, by the computer, the determining and using steps to solve each objective in the hierarchy.

9. The method of claim 8, further comprising:
delaying, by the computer, a continuation of a mainline solve to allow the one or more auxiliary solves to complete the one or more additional objectives.

10. The method of claim 8, further comprising:
updating, by the computer, bounds for the one or more auxiliary solves based on a most recently solved mainline objective.

11. The method of claim 8, wherein the one more objectives of the hierarchy each correspond to optimization of a variable independent of other objectives in the hierarchy.

12. The method of claim 8, further comprising:
determining, by the computer, a batch size and a lead size for solving the first objective in parallel with the one or more additional objectives by executing the first and one or more secondary threads in parallel.

13. The method of claim 12, wherein the batch size defines a size of a batch of objectives to solve and the lead size defines how frequent the one or more additional objectives are solved in advance.

14. The method of claim 8, further comprising:
generating a supply chain plan for a supply chain network based at least in part on the solved objectives in the hierarchy.

15. A non-transitory computer-readable medium embodied with software to solve, using a threaded architecture comprising at least a first thread and one or more secondary threads, a supply chain planning problem modeled as a multi-objective hierarchical linear programming problem, the software when executed using one or more computers:

receives supply chain input data for the supply chain planning problem;

models the supply chain planning problem as the multi-objective hierarchal linear programming problem based on the supply chain input data;

defines a hierarchy of one or more objectives specifying an order of solving the one or more objectives of the supply chain planning problem;

executes the first thread as a mainline solve of a first objective and executing the one or more secondary threads as one or more auxiliary solves of one or more additional objectives;

determines if a next objective of the hierarchy has been solved by the one or more auxiliary solves in response to the first objective being solved, and in response to the next objective being solved, using the auxiliary solve of the next objective as a starting solution for a mainline solve of the next objective;

uses a solution from a previous solved mainline objective as a starting solution for a mainline solve of the next objective in response to the next objective of the hierarchy not being solved by the one or more auxiliary solves;

kills any live threads being processed by a solver, wherein the any live threads are solving one or more solutions whose bounds are farther away than a solution associated with a particular thread, wherein the solution associated with the particular thread has bounds that are closest to a bounds specified by the multi-objective hierarchical linear programming problem; and repeats the determining and using steps to solve each objective in the hierarchy.

16. The non-transitory computer readable medium of claim 15, wherein the software when executed by one or more computers further:
delays a continuation of a mainline solve to allow the one or more auxiliary solves to complete the one or more additional objectives.

17. The non-transitory computer readable medium of claim 15, wherein the software when executed by one or more computers further:
updates bounds for the one or more auxiliary solves based on a most recently solved mainline objective.

18. The non-transitory computer readable medium of claim 15, wherein the one more objectives of the hierarchy each correspond to optimization of a variable independent of other objectives in the hierarchy.

19. The non-transitory computer readable medium of claim 15, wherein the software when executed by one or more computers further:
determines a batch size and a lead size for solving the first objective in parallel with the one or more additional objectives by executing the first and one or more secondary threads in parallel.

20. The non-transitory computer readable medium of claim 19, wherein the batch size defines a size of a batch of objectives to solve and the lead size defines how frequent the one or more additional objectives are solved in advance.

* * * * *